(12) United States Patent
Tsai

(10) Patent No.: US 8,659,405 B2
(45) Date of Patent: Feb. 25, 2014

(54) WIRELESS-CONTROL LIGHTING DEVICE

(75) Inventor: Szu-Fang Tsai, Changhua (TW)

(73) Assignee: Tektro Technology Corporation, Changhua (TW)

( * ) Notice: Subject to any disclaimer, the term of this patent is extended or adjusted under 35 U.S.C. 154(b) by 261 days.

(21) Appl. No.: 13/070,485

(22) Filed: Mar. 24, 2011

(65) Prior Publication Data

US 2012/0242471 A1  Sep. 27, 2012

(51) Int. Cl.
*B62J 3/00* (2006.01)

(52) U.S. Cl.
USPC ........................................ 340/432; 340/425.5

(58) Field of Classification Search
USPC ......................................................... 340/432
See application file for complete search history.

(56) References Cited

U.S. PATENT DOCUMENTS

| | | | | |
|---|---|---|---|---|
| 6,933,836 B2* | 8/2005 | Hsu | ............................... | 340/432 |
| 7,495,549 B2* | 2/2009 | Acres | ........................... | 340/427 |
| 2005/0191763 A1* | 9/2005 | Aoyagi et al. | ..................... | 438/2 |
| 2006/0226678 A1* | 10/2006 | Chang | ......................... | 296/180.1 |
| 2010/0117811 A1* | 5/2010 | Liu | ............................... | 340/432 |

* cited by examiner

*Primary Examiner* — George Bugg
*Assistant Examiner* — Matthew Taylor

(57) ABSTRACT

A wireless-control lighting device includes a control switch module mounted on a braking handle set, and a lighting displaying unit mounted on a bicycle and having a wireless receiver, a plurality of indicators and a second power supply. The control switch module includes a switch element, a circuit board, a wireless superconductor IC and a first power supply. The switch element and the wireless superconductor IC are electrically connected to the circuit board. The first power supply provides power to the circuit board and the wireless super conductor. When the switch element is working, and the wireless superconductor IC emits an actuating signal. The wireless receiver, the indicators and the second power supply are electrically connected to one another. The second power supply provides power to the wireless receiver and the indicators. The wireless receiver receives the actuating signal which accordingly actuates the operation of the indicators. Thereby the multiple wireless control operation can be achieved.

10 Claims, 6 Drawing Sheets

WIRELESS-CONTROL LIGHTING DEVICE

BACKGROUND OF THE INVENTION

1. Field of the Invention

The present invention relates to a lighting control device, and more particularly to a wireless-control lighting device for bicycles.

2. Description of Related Art

Taking both factors of fitness and energy saving into consideration, a bicycle has become widely common as a transport tool. A conventional bicycle does not have complete sound warning and lighting design like cars or motorcycles, and therefore would have deficiency in riding safety.

Particularly when it is dark or in poor visibility due to the rain, riding a bicycle becomes dangerous. In the case that some conventional bicycles have reflecting sheets and warning bells, the reflecting sheets work only when there are sufficient amount of light around them. If the light is too weak from the rear thereof or even no light at all, the reflecting sheets are hard to offer good warning effect. The bells intend to malfunction or be operated in wrong manner if the mechanic structures of their switch bars or clappers are cumbersome and easy to rust. Furthermore, the bell can only make sound without any lighting warning effect.

Furthermore, in the case that RF or Bluetooth is used for the wireless control of the lighting warning device, conditions for the surrounding of the user during riding could not be detected, and the external noise interference will cause interior signal transmission or errors in signal transmission.

Therefore, there is a need of a novel wireless-control lighting device which overcomes the above disadvantages of riding safety.

SUMMARY OF THE INVENTION

The object of the present invention is to provide a wireless-control switch module in combination with a braking handlebar for multiple wireless-control purpose so as to increase the safety for the user in use.

In order to achieve the above and other objectives, a wireless-control lighting device includes a control switch module mounted on a braking handle set, and a lighting displaying unit mounted on a bicycle and having a wireless receiver, a plurality of indicators and a second power supply. The control switch module includes a switch element, a circuit board, a wireless superconductor IC and a first power supply. The switch element and the wireless superconductor IC are electrically connected to the circuit board. The first power supply provides power to the circuit board and the wireless super conductor. When the switch element is working, and the wireless superconductor IC emits an actuating signal. The wireless receiver, the indicators and the second power supply are electrically connected to one another. The second power supply provides power to the wireless receiver and the indicators. The wireless receiver receives the actuating signal which accordingly actuates the operation of the indicators. Thereby the multiple wireless control operation can be achieved.

The switch element includes a braking lighting switch, a right-direction lighting switch, a left lighting switch, a head lighting switch, an electronic speaker switch, a power system switch to correspondingly control a braking lighting, a right-direction lighting, a left-direction lighting, a head lighting, an electronic speaker and a power system.

In order to further the understanding regarding the present invention, the following embodiments are provided along with illustrations to facilitate the disclosure of the present invention.

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended tables.

Figure 1:
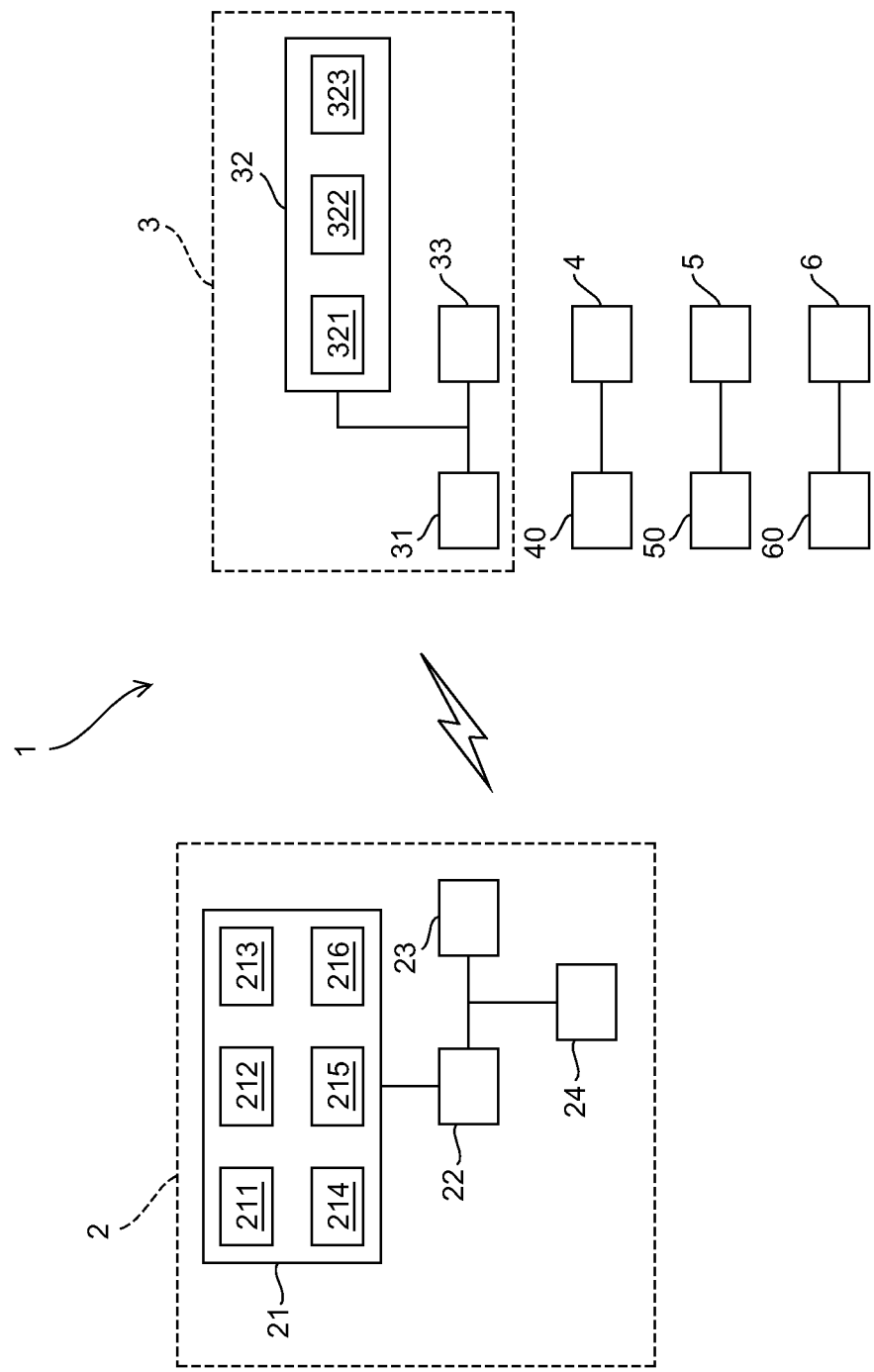
FIG. 1 is a block diagram of a wireless-control lighting device according to the invention.
Figure 2:
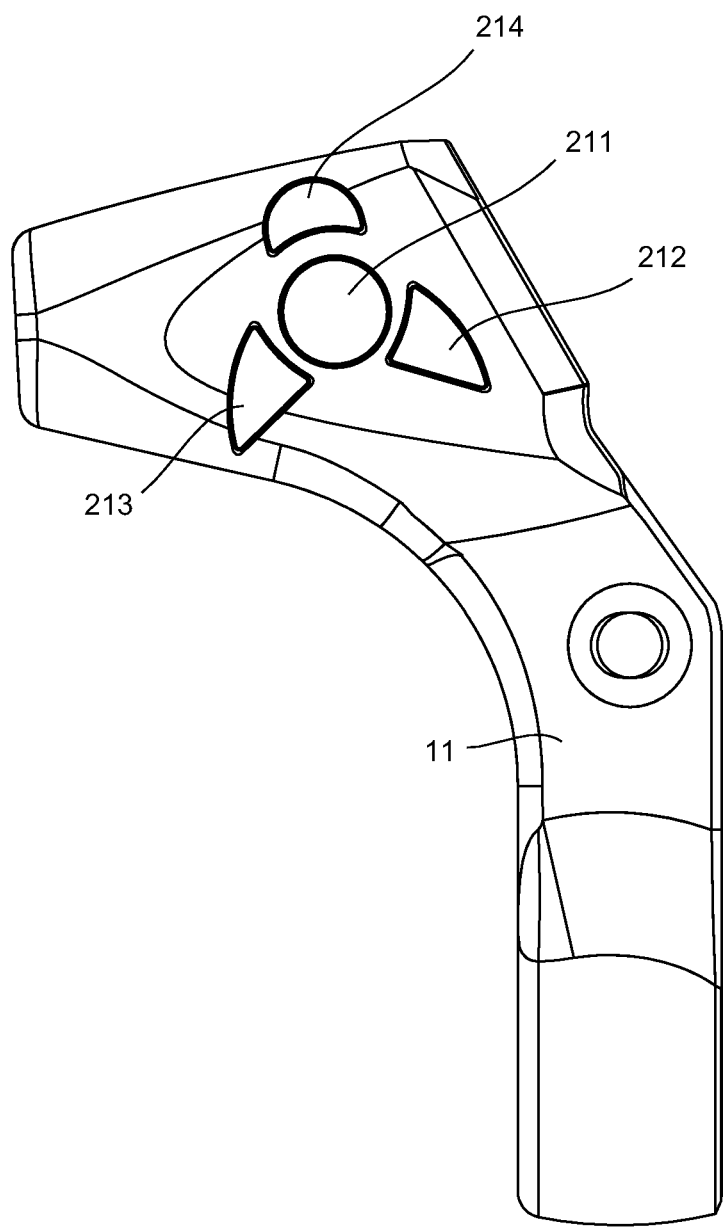
FIG. 2 is a schematic view of a wireless-control lighting device mounted on a braking handle set of a bicycle according to the invention.
Figure 3:
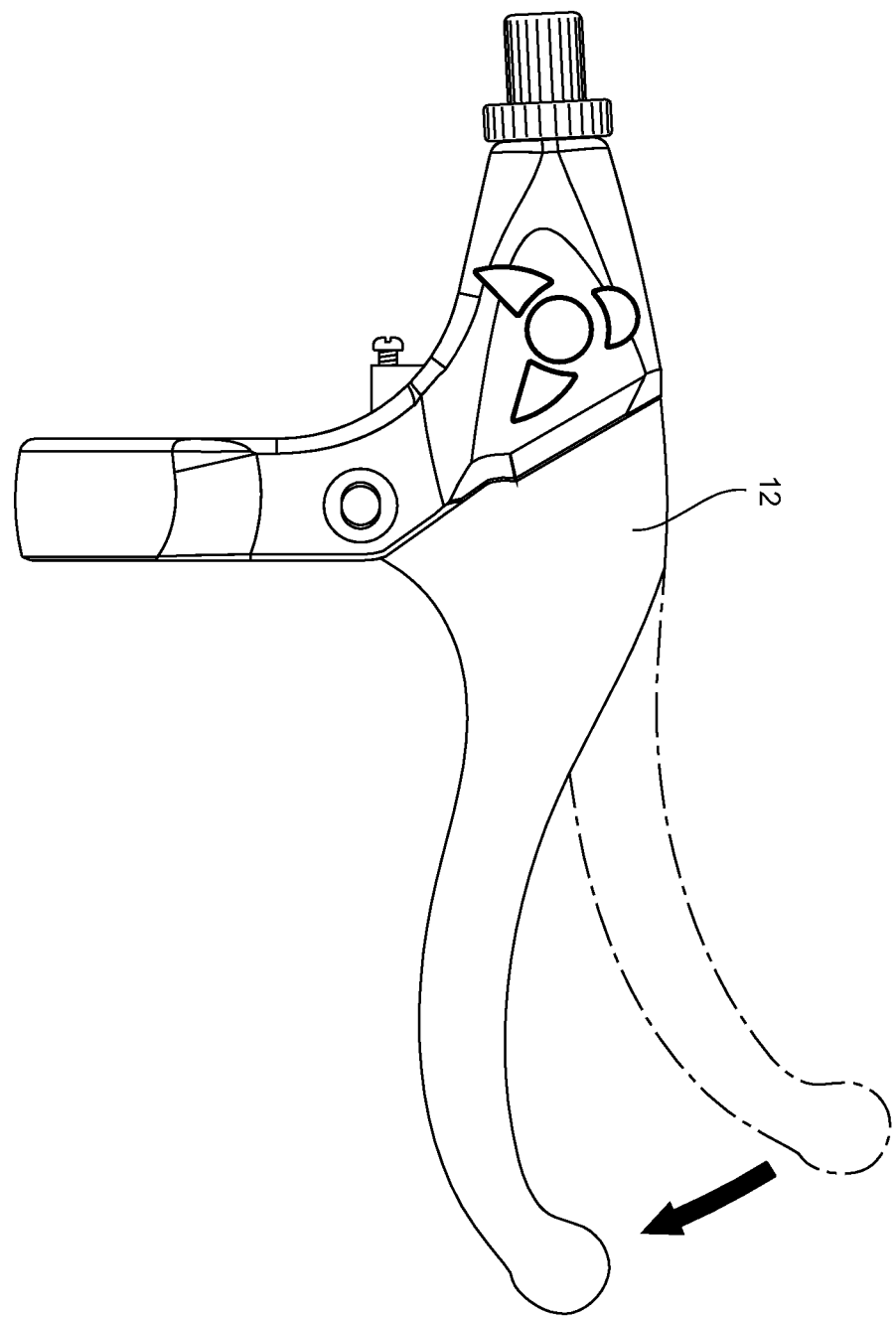
FIG. 3 is a schematic view of a wireless-control lighting device mounted on a braking handlebar of a bicycle according to the invention.
Figure 4:
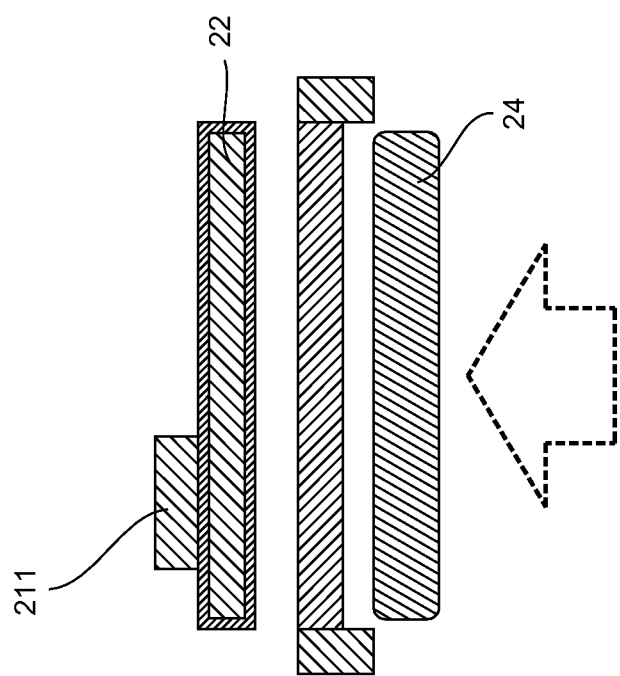
FIG. 4 is a schematic view of a braking switch in a wire-less control lighting device according to the invention.
Figure 5:
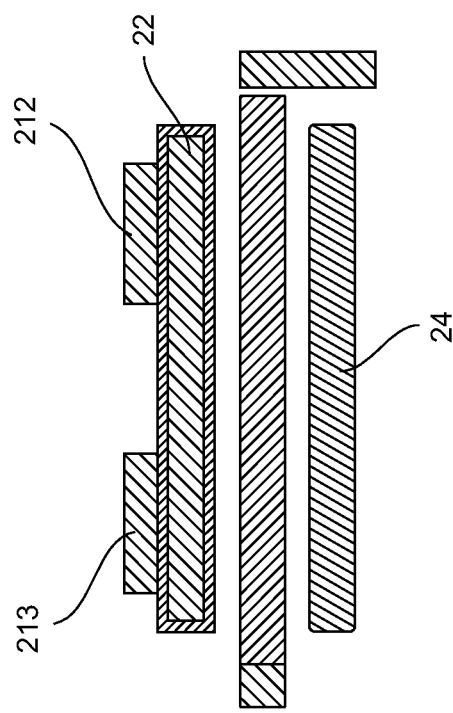
FIG. 5 is a schematic view of a right-direction lighting switch and a left-direction lighting switch in a wireless-control lighting device according to the invention.
Figure 6:
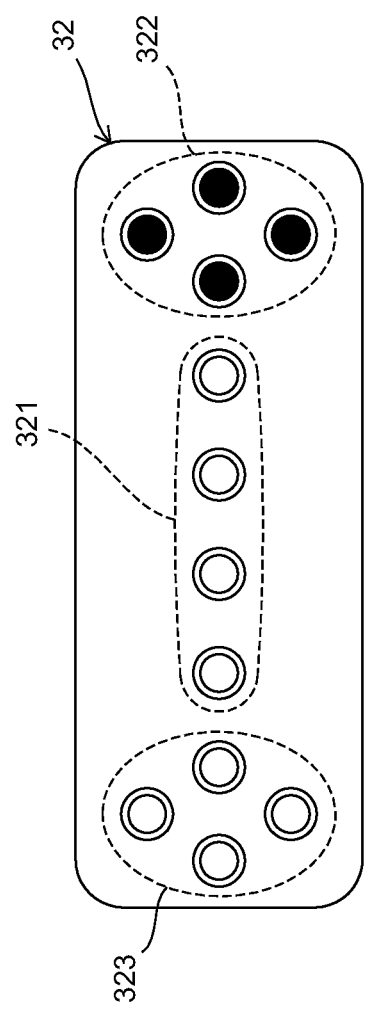
FIG. 6 is a schematic view of an indicator in a wireless-control lighting device according to the invention.

FIG. 1 is a block diagram of a wireless-control lighting device according to the invention. FIG. 2 is a schematic view of a wireless-control lighting device mounted on a braking handle set of a bicycle according to the invention. FIG. 3 is a schematic view of a wireless-control lighting device mounted on a braking handlebar of a bicycle according to the invention. FIG. 4 is a schematic view of a braking switch in a wire-less control lighting device according to the invention. FIG. 5 is a schematic view of a right-direction lighting switch and a left-direction lighting switch in a wireless-control lighting device according to the invention. FIG. 6 is a schematic view of an indicator in a wireless-control lighting device according to the invention.

The wireless-control lighting device 1 according to the invention includes a control switch module 2 and a light displaying unit 3.

The control switch module 2 is mounted on a braking handle set 11, and includes a switch element 21, a circuit board 22, a wireless superconductor IC 23 and a first power supply 24. The switch element 21 and the wireless superconductor 23 are electrically connected to the circuit board 22. The first power supply 24 provides power to the circuit board 22 and the wireless superconductor IC 23. When the switch element 21 is working, the wireless superconductor IC 23 emits an actuating signal.

The superconductor is found in 1911 by Dutch scientist Kammerligh Onnes, which could work well in presentence of no electrical resistance when the temperature is around absolute zero degree. When the temperature is down to about 4K (−269° C.) which the helium becomes liquefied, some materials have the same phenomenon. The superconductor of first generation is generally referred to be as a low temperature superconductor (LTS) material having superconducting transition temperature which is also called as critical temperature Tc (even the temperature exceeds this transition temperature, the material still has superconducting phenomenon) of about 39K above the absolute zero degree. When the temperature is lower than the critical temperature Tc, the material has zero resistance and diamagnetism. Therefore the signal emitted from the wireless superconducting IC 23 used in the invention can prevent any signal interference and high power consumption.

The light displaying unit 3 is mounted at a proper position of a bicycle (not shown), for example a rear of the bicycle. The light displaying unit 3 has a wireless receiver 31, a plurality of indicators 32 and a second power supply 33. The wireless receiver 31, the indicators 32 and the second power supply 33 are electrically connected. The second power supply 33 provides power to the wireless receiver 31 and the indicators 32. The wireless receiver 31 receives the actuating signal which accordingly actuates the operation of the indicators 32.

The switch element 21 at least includes a braking lighting switch 211, a right-direction lighting switch 212 and a left braking lighting switch 213.

The braking lighting switch 211 can be a magnetic switch. At least one of the indicators 32 has a braking lighting 321 consisting of a plurality of LEDs. When one of the braking handlebar 12 of the bicycle (not shown) comes to action and thereby changes the magnet field, the braking lighting switch 211 (magnetic switch) is working so that the actuating signal becomes a braking lighting signal which is then transmitted to the wireless receiver 31 and accordingly to turn on or off the braking lighting 321.

The right-direction lighting switch 212 and the left braking lighting switch 213 are respectively a press switch. At least one indicator has a right-direction lighting 322 and a left-direction lighting 323. The right-direction lighting switch 212 is working or the left-direction lighting switch 213 is working as soon as pressed down, and the actuating signal becomes a right-direction lighting signal or a left-direction lighting signal which is then transmitted to the wireless receiver 31. The right-direction lighting 322 or the left-direction lighting 323 turns on or turns off according to the received signal. The right-direction lighting 322 and the left-direction lighting 323 respectively consist of a plurality of LEDs, and can be flashing for 15 seconds with each cycle of 3 or 4 seconds when turn on.

The wireless-control lighting device 1 further includes a head lighting 4 consisting of a plurality of LEDs and a wireless receiver 40. The head lighting 4 is mounted at front of the bicycle (not shown). The switch element 21 further includes a head lighting switch 214. The head lighting switch 214 is a press switch. The head light switch 214 is working as soon as pressed down, and the actuating signal becomes a head lighting signal which is then transmitted to the wireless receiver 40 and accordingly to turn on or off the head lighting 4.

Furthermore, the wireless-control lighting device 1 further includes an electronic speaker 5 and a wireless receiver 50. The electronic speaker 5 is mounted on the bicycle (not shown). The switch element 21 further includes an electronic speaker switch 215. The electronic speaker switch 215 can be a press switch. The electronic speaker switch 215 is working as soon as pressed down, and the actuating signal becomes an electronic speaker signal which is then transmitted to the wireless receiver 50 and the electronic speaker 5 accordingly makes a sound such as a warning voice or music.

Furthermore, the above bicycle (not shown) can be a power-driven bicycle having a power system 6 and a wireless receiver 60. The switch element 21 further includes a power system switch 216 which can be a press switch. The power system switch 216 is working as soon as being pressed, and the actuating signal becomes a power system signal which is then transmitted to the wireless receiver 60 and accordingly to start or stop the operation of the power system 6.

Therefore, with the above configuration, the superconductor IC 23 is used to receive and transmit the signal. The distinguishing characters of non electric resistance and reverse magnetism for the superconductor material can shield off any signal interference (noise) and prevent any high power consumption, compared to the RF or Bluetooth. Through each functional switch of the switch element 21 in the control switch module 2, such as the braking lighting switch 211, the right-direction lighting switch 212, the left braking lighting switch 213, the head lighting switch 214, the electronic speaker switch 215 and the power system switch 216, the corresponding elements such as the braking lighting 321, the right-direction lighting 322, the left braking lighting 323, the head lighting 4, the electronic speaker 5 and the power system 6, are controlled to reach multiple wireless control and thereby increase the safety for the user in use.

The descriptions illustrated supra set forth simply the preferred embodiments of the present invention; however, the characteristics of the present invention are by no means restricted thereto. All changes, alternations, or modifications conveniently considered by those skilled in the art are deemed to be encompassed within the scope of the present invention delineated by the following claims.

What is claimed is:

1. A wireless-control lighting device, comprising:
a control switch module, mounted on a braking handle set, the control switch module comprising a switch element, a circuit board, a wireless superconductor IC and a first power supply; the switch element and the wireless superconductor IC are electrically connected to the circuit board; the first power supply provides power to the circuit board and a wireless superconductor IC; when the switch element is working, and the wireless superconductor IC emits an actuating signal; and
a lighting displaying unit, mounted on a bicycle, wherein said bicycle is a power-driven bicycle having a power system and a wireless receiver; the switch element further comprises a power system switch; the power system switch is a press switch; the power system switch is working as soon as pressed down, and the actuating signal becomes a power system signal which is then transmitted to the wireless receiver to start or stop the operation of the power system, and having a wireless receiver, a plurality of indicators and a second power supply; the wireless receiver, the indicators and the second power supply are electrically connected to one another; the second power supply provides power to the wireless receiver and the indicators; and the wireless receiver receives the actuating signal which accordingly actuates the operation of the indicators.

2. The wireless-control lighting device of claim 1, wherein the switch element at least includes a braking lighting switch, a right-direction lighting switch and a left-direction lighting switch.

3. The wireless-control lighting device of claim 2, wherein the braking lighting switch is a magnetic switch; at least one of the indicators has a braking lighting consisting of a plurality of LEDs; and when one of a braking handle of the bicycle comes to action and thereby changes the magnet field, the braking lighting switch is working so that the actuating signal becomes a braking lighting signal which is then transmitted to the wireless receiver to turn on or off the braking lighting.

4. The wireless-control lighting device of claim 3, wherein the braking lighting consists of a plurality of LEDs.

5. The wireless-control lighting device of claim 2, wherein the right-direction lighting and the left braking lighting switch are respectively a press switch; at least one indicator has a right-direction lighting and a left-direction lighting; the right-direction lighting switch is working or a left-direction lighting switch is working as soon as pressed down, and the actuating signal becomes a right-direction lighting signal or a left-direction lighting signal which is then transmitted to the wireless receiver; the right-direction lighting or the left-direction lighting turns on or turns off according to the received signal.

6. The wireless-control lighting device of claim 5, wherein the right-direction lighting and the left-direction lighting respectively consist of a plurality of LEDs.

7. The wireless-control lighting device of 2, further comprising a head lighting and a wireless receiver; the head lighting is mounted at front of the bicycle; the switch element further comprises a head lighting switch; the head lighting switch is a press switch; the head switch is working as soon as being pressed down and the actuating signal becomes a head lighting signal which is then transmitted to the wireless receiver and accordingly to turn on or off the head lighting.

8. The wireless-control lighting device of claim 7, wherein the head lighting consists of a plurality of LEDs.

9. The wireless-control lighting device of claim 5, wherein the right-direction lighting and the left-direction lighting are flashing for 15 seconds with each cycle of 3 or 4 seconds when turn on.

10. The wireless-control lighting device of claim 7, further comprising an electronic speaker and a wireless receiver; the electronic speaker is mounted on the bicycle; the switch element further comprises an electronic speaker switch; the electronic speaker switch is a press switch; the electronic speaker switch is working as soon as pressed down, and the actuating signal becomes an electronic speaker signal which is then transmitted to the wireless receiver and the electronic speaker accordingly makes a sound.

\* \* \* \* \*